United States Patent
Komaki et al.

(10) Patent No.: US 7,500,998 B2
(45) Date of Patent: *Mar. 10, 2009

(54) METHOD AND APPARATUS FOR REFORMING FUEL

(75) Inventors: Hideaki Komaki, Ota-ku (JP); Kunio Matsui, Yokohama (JP)

(73) Assignee: IHI Corp., Tokyo (JP)

( * ) Notice: Subject to any disclaimer, the term of this patent is extended or adjusted under 35 U.S.C. 154(b) by 975 days.

This patent is subject to a terminal disclaimer.

(21) Appl. No.: 10/777,187

(22) Filed: Feb. 13, 2004

(65) Prior Publication Data

US 2004/0159046 A1 Aug. 19, 2004

Related U.S. Application Data

(62) Division of application No. 09/940,628, filed on Aug. 29, 2001, now Pat. No. 6,833,126.

(30) Foreign Application Priority Data

Mar. 30, 2001 (JP) .............................. 2001/099269
Apr. 27, 2001 (JP) .............................. 2001/133213

(51) Int. Cl.
  *B01J 8/00* (2006.01)

(52) U.S. Cl. ...................... 48/127.9; 422/207; 422/188; 422/189; 422/194; 422/213; 48/61; 48/94; 48/95

(58) Field of Classification Search ................. 422/189, 422/190, 192
See application file for complete search history.

(56) References Cited

U.S. PATENT DOCUMENTS

| 4,311,671 | A | 1/1982 | Notman |
| 4,927,857 | A | 5/1990 | McShea et al. |
| 5,048,284 | A | 9/1991 | Lywood et al. |
| 5,753,194 | A | 5/1998 | Heil et al. |
| 6,299,853 | B1 | 10/2001 | Boneberg et al. |
| 6,397,790 | B1 * | 6/2002 | Collier, Jr. ..................... 123/3 |

FOREIGN PATENT DOCUMENTS

| DE | 44 20 753 A1 | 9/1995 |
| EP | 0 112 613 A3 | 7/1984 |
| EP | 0 995 716 A1 | 9/1999 |

OTHER PUBLICATIONS

European Search Report in corresponding EP 01 12 0816, completed May 12, 2003, and mailed May 28, 2003.

* cited by examiner

*Primary Examiner*—Alexa D. Neckel
*Assistant Examiner*—Kaity V. Handal
(74) *Attorney, Agent, or Firm*—Griffin & Szipl, P.C.

(57) ABSTRACT

A gas mixture containing a fuel, water and air is supplied to one end of a reforming room, and a reformed gas containing hydrogen is discharged from the other end thereof. Two or more such reforming units are connected in series, and the upstream part of each reforming room is filled with a first catalyst which catalyzes a partial oxidation reaction in an oxygen-rich environment, and the downstream part is filled with a second catalyst which performs the reforming reaction. The gas mixture which has been heated in a heating unit passes through a distribution tube and is distributed evenly to the reforming units. The reforming room is composed of a reforming tube in which a reforming catalyst is charged, or two or more such reforming tubes, parallel to each other. After being reformed the high-temperature reformed gas is passed around the reforming tubes, and fed back to a manifold.

4 Claims, 6 Drawing Sheets

METHOD AND APPARATUS FOR REFORMING FUEL

This application is a divisional of U.S. patent application Ser. No. 09/940,628, filed Aug. 29, 2001, and claims priority from Japanese Patent Application Nos. 099269/2001, filed Mar. 30, 2001, and 133213/2001, filed Apr. 27, 2001, the entire disclosures of which are incorporated herein by reference.

BACKGROUND OF THE INVENTION

1. Technical Field of the Invention

The present invention relates to a method and apparatus for reforming a hydrocarbon-based fuel, alcohol, etc. into a fuel gas containing hydrogen, for industries which use high-purity hydrogen as a fuel, such as for fuel cells.

2. Prior Art

When electric power is generated using fuel cells, hydrogen is supplied to the fuel cells; a fuel gas containing hydrogen is produced from a raw material consisting of hydrocarbon based fuels, e.g. butane or propane, or alcohol based fuel such as methanol; the raw material is reformed in a reforming vessel containing a catalyst, in which a mixture of the fuel gas, steam and air is reformed.

The reforming reaction proceeds at a rather high-temperature and heat is absorbed during the reaction, so when a conventional reforming device is used, the mixed gas is heated sufficiently in a preheater, and using the heat retained in the gas, the temperature of the catalyst is increased, or is otherwise heated by an external means, so as to expedite the reforming reaction.

Recently, a self-heating system is currently used for a reforming device. In the self-heating system, a mixed gas and reforming catalyst are heated by the oxidation of a part of the mixed gas and the gas is reformed by the heat.

If a gas mixture is supplied to one end of a reforming device filled with a partial oxidation catalyst and a reforming catalyst, and if the reformed gas is discharged from the other end after the gas mixture has made contact with the partial oxidation catalyst and the reforming catalyst, then only the upstream portion of the reforming catalyst near the partial oxidation catalyst is over-heated, and the temperature of the downstream portion of the reforming catalyst, located further away from the partial oxidation catalyst increases after a time delay. As a result, the temperature distribution of the reforming catalyst is uneven, therefore, a fairly long time is required before the temperature of the entire reforming catalyst has been increased, so the reforming device cannot be started up quickly.

In addition, because part of the reforming catalyst is over-heated due to the uneven temperatures distribution, deterioration of the catalyst, such as sintering occurs.

Recently, a new reforming device has been developed and is in practical use; the partial oxidation catalyst and the reforming catalyst are installed in multiple layers, so as to distribute the temperature increase of the reforming catalyst more evenly. This type of reforming device is typically classified into the series type shown in FIG. 1, and the parallel type in FIG. 2.

In the series-type reforming device, the reforming room is arranged in multiple stages (3 stages in FIG. 1) and each stage has a partial oxidation catalyst on the upstream side and a reforming catalyst downstream, and a gas mixture containing a fuel vapor such as methanol, steam and a small amount of air is introduced at one end of the device, and the reformed gas is discharged from the other end. To expedite the partial oxidation reaction of the gas mixture, additional air is fed into the second and third reforming rooms. In the series-type reforming device, the temperatures of the reforming catalysts in each stage are increased automatically by the heat of the partial oxidation reaction, and the length of the passage in which the gas mixture contacts the reforming catalyst can be made long, so the advantage of a high reforming rate can be expected.

Conversely in the parallel-type reforming device, partial oxidation catalysts and reforming catalysts are arranged in a number of stages (3 stages in FIG. 2), in the same way as with the series-type device, and each stage is separated from the others, and a gas mixture containing a fuel vapor such as methanol, steam and a small amount of air is supplied to each stage, and a reformed gas is discharged from each stage. Also with this parallel-type device, the temperatures of the reforming catalysts in each stage can be increased evenly using internally generated heat, and because only the gas mixture is distributed to each stage of the reforming device, the construction can be simplified which is an advantage. If part of the reforming catalyst etc. deteriorates accidentally, each stage can be quite easily replaced individually, which is also an advantage.

However, the aforementioned series- and parallel-type reforming devices are accompanied with the following problems.

(1) With the series-type reforming device, air must be supplied to the reforming rooms at the second and subsequent stages from an external source, so the air piping is complicated and requires a dedicated space. The air supplied from outside must be mixed completely with the gas mixture in the small space between adjacent reforming rooms and then fed to the reforming rooms, but this space is normally small, so the mixing often becomes incomplete. As a consequence, inappropriate reactions may sometimes take place, for example, irregularities may occur in the partial oxidation or reforming reactions.

(2) With the parallel-type reforming device, on the contrary, since the fuel mixture such as methanol, steam and air is mixed completely beforehand and then fed to each reforming room, the problems mentioned above for the series-type reforming device do not occur. However, as the length of the passage in which the gas mixture contacts the reforming catalyst is short, the necessary reforming rate may not be obtained when the distribution of reforming catalysts or the distribution of carrier materials are not maintained evenly.

When a reforming device is used for fuel cells in an electric automobile etc., the motor must be started quickly by generating electric power by supplying high-purity hydrogen into the stack of fuel cells as quickly as possible. The device must also be as compact as possible.

However, with a conventional self-heating system of series- or parallel-type reforming devices, compactness of the device is inconsistent with a high reforming rate as described above.

The hydrogen, required to generate electric power in a fuel cell, is produced by a reforming reaction using a raw material consisting of either a hydrocarbon based fuel, such as butane and propane, or an alcohol based fuel, such as methanol. However, because the hydrogen-rich reformed gas produced by the reforming reaction contains a large amount of carbon monoxide (CO) as an impurity, it should be removed before supplying it to a fuel cell that requires high-purity hydrogen. This is because if CO is fed into the fuel electrode of the fuel cell, it is adsorbed by the catalyst in the electrode, poisons the catalyst, decrease the reaction at the electrode, and lowers the electricity-generating performance.

Under these circumstances, the reforming device is normally provided with a CO removal unit filled with a CO removing catalyst, where a selective CO oxidation reaction ($CO+1/2O_2 \rightarrow CO_2$) or, if required, a CO shifting reaction ($CO+H_2O \rightarrow CO_2+H_2$) occurs, thus the concentration of carbon monoxide is reduced, in this additional mechanism.

With a reforming device that produces hydrogen-rich reformed gas from a hydrocarbon-based fuel or an alcohol fuel, the reforming reaction proceeds endothermically, so heat must be supplied to the reforming unit. In addition, it is also important to supply heat to increase the rate of the reforming reaction. Therefore, in many cases, fuel gas, water and air are heated by an external heat source to a temperature appropriate for the reforming reaction, to produce a high-temperature vapor which is then fed to the reforming unit, or the gas mixture is heated up to such a temperature in the reforming unit where the reforming reaction takes place.

On the other hand, a CO removal unit containing a catalyst mainly intended to decrease the concentration of CO contained in the reformed gas produced in the reforming unit. the selective CO oxidation reaction begins at about 100 to 200° C. and a CO shift reaction occurs at about 200 to 300° C. In addition these reactions are exothermic, the temperature of the CO removal catalyst should be prevented from increasing in order to obtain a high CO removal rate. For this reason a conventional reforming device of the reforming unit must be designed to be seperate from the CO removal unit, or if an integrated design is used, a thermal insulation material is required to prevent the heat transfer from the reforming unit to the CO removing unit, and a method of cooling the CO removal unit should be used.

Furthermore, carbon monoxide created in the reforming reaction poisons the electrode catalyst in the fuel cell as described above, and interferes with the reaction of the electrode, so it should be removed from the reformed gas by a CO removal reaction. However, since the CO removal reaction is exothermic, if heat is transmitted from the reforming unit to the carbon monoxide removal portion (CO removal unit), the CO removal reaction does not proceed.

Consequently, in an integrated reforming device composed of a reforming unit and a CO removal unit, the heat transfer from the reforming unit to the CO removal unit must be decreased and the loss of heat from the reforming unit at high operating temperatures must be prevented.

Conventionally, the reforming catalyst is installed in a single cylindrical or square vessel, therefore when the device generates a large output, the sectional area of the passages in the catalyst vessel is also large, often resulting in an irregular distribution of fuel gas flow in the catalyst vessel, and a satisfactory reforming reaction is often not achieved.

When the reforming unit is constructed with the reforming catalyst installed in a single catalyst vessel, if even part of the catalyst deteriorates as a result of operating with an unbalanced flow of the gas mixture, the whole reforming unit must be replaced.

SUMMARY OF THE INVENTION

The present invention aims at solving the aforementioned various problems. The first object of the present invention is to offer a reforming method and a reforming apparatus, in which the temperature of the reforming catalyst can be increased, evenly and rapidly at the time of starting, a reformed gas with a high degree of reforming can be produced, and the apparatus is compact and can be easily maintained.

The second object of the present invention is to provide a small reforming apparatus that can produce high-purity hydrogen gas by (1) increasing the temperature of the reforming catalyst, while preventing heat losses caused by heat transfer from the reforming catalyst to the outside, (2) adjusting the cross section of the reforming tubes to give an appropriate area taking into account the number of reforming tubes and the output, thereby making the gas mixture flow evenly through the reforming catalyst, and more preferably (3) by improving the CO removal reaction by suppressing the heat transfer from the reforming unit to the CO removal unit.

To achieve the first object of the present invention, two or more reforming rooms (6) are connected in series; a gas mixture (2) of fuel, water and air is supplied to one end of each unit, and a reformed gas containing hydrogen is discharged from the other end; a first catalyst (8a) that catalyzes the partial oxidation of the fuel in an oxygen environment is installed on the upstream side of each of the aforementioned reforming rooms; a second catalyst (8b) that catalyzes the reforming reaction is installed on the downstream side thereof; the above-mentioned gas mixture is supplied directly to one end of each reforming room, and the reformed gas is discharged from the end of the reforming room furthest downstream.

According to the aforementioned reforming method of the present invention, the second catalyst in each reforming room can be evenly and quickly heated up by the internal heating produced by the above-mentioned self-heating effect in each reforming room, thereby reformed gas containing high-purity hydrogen gas can be produced immediately after starting up. In addition, because the length of the passage in which the gas mixture contacts the second catalyst can be made long, the degree of reforming can also be improved.

An identical catalyst that can accelerate both the partial oxidation reaction and the reforming reaction may also be used for the aforementioned first catalyst (8a) and second catalyst (8b).

In a self-heating system currently used in a reforming device, different catalysts are normally used to accelerate the oxidation reaction and the reforming reaction and these are installed on the upstream and downstream sides respectively. However, some catalysts can expedite both the partial oxidation and reforming reactions. When such a catalyst is incorporated, the reforming room is completely filled with the catalyst and the temperature of the catalyst is increased by the self-heating effect, thus the reforming reaction can be initiated very quickly from the start of operation.

The present invention also offers a reforming method using a reforming tube (10) comprised of two or more of the above-mentioned reforming rooms (6) connected in series and a reformer housing (12) that houses the aforementioned reforming tube, wherein a high-temperature heating gas (16) is introduced into the space (14) formed between the reforming tube and the reformer housing, and after the above-mentioned first catalyst (8a) and the second catalyst (8b) have been heated up from outside the reforming room, the gas mixture (2) is supplied into each reforming room and reformed.

The present invention also offers a reforming method with the novel characteristics that a high-temperature heating gas (16) is supplied directly to one end of each of the aforementioned reforming rooms (6), and is discharged from the other end of the most downstream reforming room, and after the above-mentioned first catalyst (8a) and second catalyst (8b) are heated up from the inside of the reforming room, the gas mixture (2) is fed to each reforming room where it is reformed.

To efficiently reform a gas mixture in a reformer, it is considered necessary to heat the reforming catalyst sufficiently, beforehand. According to the above-mentioned reforming method, the first and second catalysts are heated up evenly and satisfactorily in advance from outside and/or inside using a high-temperature heating gas that has been heated using an external combustor etc., and then the supply of heating gas is stopped, and the gas mixture is fed in, therefore, the reforming reaction can take place efficiently immediately after the gas mixture is supplied. In other words, the reforming reaction can be initiated quickly after start-up, and in addition, the cost of the fuels is also saved.

The present invention also provides a reformer equipped with a mixed gas feeding tube (18) that supplies the gas mixture (2) of fuel, water and air and a reforming tube (10) that converts the above-mentioned mixed gas to a reformed gas (4) containing hydrogen, in which the aforementioned reforming tube is comprised of two or more reforming rooms (6) in series, where the gas mixture (2) is fed in to one end thereof and the reformed gas (4) containing hydrogen is discharged from the other end thereof; each of the aforementioned reforming rooms is filled with a first catalyst (8a) for partial oxidation in an oxygen-rich environment on the upstream side and a second catalyst (8b) for reforming downstream, and the above-mentioned mixed gas feed tube is provided with a means of feeding gas (20) that supplies the gas mixture directly to each reforming room.

The reforming rooms are connected in series, and the gas mixture that has been thoroughly premixed is supplied directly to each reforming room, thereby the second catalyst can be heated up by the self-heating effect, at an early stage in each reforming room. In addition, because the gas mixture supplied to the upstream reforming room also passes through the downstream reforming rooms and is discharged from the other end of the most downstream reforming room, the length of the passage in which the gas contacts the second catalysts is long, so the reforming rate can be improved. Compared to a conventional series-type reforming tube, no external piping needs to be introduced, therefore, the construction is simplified and the equipment can be made compact.

In addition, modular reforming tubes can be used, and the number of reforming tubes can be increased or decreased depending on the output required for the reformer. Also, since the gas mixture can be distributed evenly to each unit, the gas mixture that flows through the catalyst can be prevented from being unevenly distributed across the sectional area, so the reforming reaction can be accelerated. In addition, because the reforming tubes of each unit can be replaced, the apparatus can be easily maintained.

Here, the aforementioned means of feeding gas (20) is an outer cylinder (24) that covers at least part of the downstream end and side surface of the aforementioned reforming tube (10), and the circumferential gap (22) between the reforming tube and the cylinder forms a passage for the mixed gas (2); on the side surface of the above-mentioned reforming tube, inlet ports (26) are provided to feed the gas mixture to each reforming room from the above-mentioned gap; each of the aforementioned inlet ports is provided with flow control mechanisms (28a, 28b) or flow regulate means (32a, 32b) for adjusting the flow of the gas mixture supplied to each reforming room. This construction is also the preferred method of supplying the gas mixture to each reforming room.

The outer cylinder is arranged so that it covers the side surface of the reforming tube, and the gap between the outer cylinder and the reforming tube is used as a flow passage for the gas mixture, thereby piping is no longer needed to supply the gas mixture to each reforming room, so the reformer can be made simple and compact. This outer cylinder can also suppress heat transfer from the reforming room to outside.

The reason that the inlet ports disposed on the reforming tube are provided with flow control mechanisms or flow regulate means is that if simple inlet ports are constructed on the reforming tube to supply the gas mixture, the gas mixture cannot be supplied to each reforming room with the appropriate distribution. More explicitly, because the supplied gas mixture tends to flow into a passage with a low pressure drop, therefore if only inlet ports are provided, most of the gas mixture will flow into the most downstream reforming room. A variable mechanism etc. disposed at each inlet port provides an appropriate pressure drop (load), so that the gas mixture distributes in each reforming room in an optimal manner.

The aforementioned means of feeding gas (20) are composed of a penetration tube (34) with the structure of a hollow tube that makes the above-mentioned gas mixture (2) flow through the inside of at least one reforming room, from one downstream end of the aforementioned reforming tube (10); the above-mentioned penetration tube is provided with inlet ports (36a, 36b) that supply the gas mixture to each reforming room; and at the above-mentioned inlet ports, flow control mechanisms (28a, 28b) or flow regulate means (32a, 32b) are provided to adjust the flow of the gas mixture introduced into each reforming room, using the aforementioned means, therefore the gas mixture can be fed appropriately to each reforming room.

The gas mixture can also be supplied to each reforming room from the inside of the reforming tube using a penetration tube in place of the above-mentioned outer cylinder. In this case, flow control mechanisms or flow regulate means are also arranged at the inlet ports for the same reason as described above. Here, the flow control mechanisms and flow regulate means may be composed of flow control valves and orifices, respectively.

Other preferable configurations according to the present invention include the provision of a reformer housing (12) that houses the aforementioned reforming tube (10) and an initial heating gas tube (38a) that introduces high-temperature heating gas (16) into the space (14) formed between the above-mentioned reformer housing and the aforementioned reforming tube; then or after the reforming room has been heated up from the outside, a second heating gas tube (38b), connected to the aforementioned mixed gas feed tube (18) introduces high-temperature heating gas (16) from the outside, and after the reforming room has been heated up from the inside, the gas mixture is supplied.

The high-temperature heating gas, after being heated up in a combustor etc., is introduced into the space between the reformer housing and the reforming tube, and preferably it is directed towards the reforming tube, thereby the reforming tube and the catalyst are heated up from the outside, or by supplying the heating gas to each reforming room through the mixed gas feed tube, the catalyst etc. can be heated up satisfactorily from the inside, and then the introduction of the heating gas is stopped, and the gas mixture is introduced. According to this method, the reforming reaction can be implemented quickly and efficiently from the beginning.

To achieve the aforementioned second object, the present invention provides a reforming apparatus that converts a mixed gas (102) comprised of fuel gas, steam and air, into hydrogen; the above-mentioned reforming apparatus is composed of a heating unit (104) that vaporizes and heats the aforementioned gas mixture, a distribution tube (108) that evenly distributes the heated gas mixture to a plurality of branch ports (106) at one end thereof, a reforming unit (114)

filled with a reforming catalyst (112) to catalyze a reforming reaction in the aforementioned gas mixture, a manifold (116) in which the above-mentioned distribution tube is disposed, a CO removal unit (124) fully filled with a CO removing catalyst (122) that catalyzes the CO removal reaction of the gas (118) reformed in the aforementioned reforming unit, and a casing (126) that houses the above-mentioned reforming unit, the aforementioned manifold and the above-mentioned CO removal unit; the aforementioned reforming unit is configured with a reforming room (132) and a feedback mechanism (134), in which the reforming room is composed of a reforming tube (130) one end of which is connected to the aforementioned branch port and reformed gas is discharged from the other end thereof, or two or more such reforming tubes arranged in parallel, and the feedback mechanism allows the above-mentioned reformed gas to flow through the outer periphery of the aforementioned reforming tube and sends the gas to the above-mentioned manifold.

The gas mixture (102), vaporized and heated in the heating unit (104), is distributed through the distribution tube (108) and is supplied to one reforming tube (130) or a plurality of tubes (130), and undergoes a reforming reaction in the reforming tube or tubes. Here, an orifice or a sintered panel or the like is provided at the inlet of the distribution tube, thus the gas mixture is distributed to the reforming tube or tubes; and the cross section of the reforming tube is adjusted according to the relationship between the number of reforming tubes and the output, to give an optimum area, that is, when a small amount of the reformed gas is demanded, the number of reforming tubes is reduced, and a reforming tube with a slightly smaller sectional area is used; when a large amount of reformed gas is required, the number of reforming tubes is increased and also a reforming tube with a slightly larger cross section is used, thereby the gas mixture is distributed evenly across the cross section and along the length of each reforming tube, and in this way, the gas mixture can be diffused uniformly into the interior of each reforming tube. As a result, the gas mixture and the reforming catalyst can be made to contact each other efficiently, and the reforming reaction can be expedited.

In addition, by sending the high-temperature reformed gas to the manifold (116) through the outer periphery of the reforming tube, heat losses from the reforming tube to the outside can be decreased.

Here, the aforementioned CO removal unit (124) can preferably communicate with the above-mentioned manifold (116), and be positioned opposite the aforementioned reforming unit (114).

According to the reforming apparatus of the present invention, because the reforming unit (114) wherein a reaction takes place at a rather high temperature can be connected freely to the CO removal unit (124) in which another reaction occurs at a temperature lower than the above temperature, heat transmission from the reforming unit to the CO removal unit can be prevented by, for example, positioning the manifold between them, so even if the reforming unit and the CO removal unit are formed as an integral unit, the reforming apparatus can be made smaller in size.

In the above, the aforementioned feedback mechanism (134) may also preferably send the above-mentioned reformed gas (118) to the aforementioned manifold, through the space between the aforementioned adjacent reforming tubes (130) or through a reformed gas passage (136) consisting of a longitudinal gap parallel to the axis of the reforming tube, formed between the above-mentioned reforming tube and the aforementioned casing (126).

The gap created between adjacent reforming tubes (130) or between the aforementioned reforming tube and the above-mentioned casing (126) can be used as a passage (136) for the reformed gas, and by sending the high-temperature reformed gas (118) to the manifold (116) along the outer periphery of the reforming tube, the high-temperature reformed gas can completely fill the space around the outer periphery of the reforming tube, thus efficiently suppressing heat transfer from the reforming tube to the outside, and special piping etc. is no longer needed to send the reformed gas to the manifold, therefore, the construction of the apparatus can be simplified.

In addition, the aforementioned reforming tube (130) can preferably be removable and replaceable.

Because the reforming tube (130) filled with the reforming catalyst (12) is structured as a modular unit, each reforming tube can be inspected and replaced, so the apparatus can be maintained more easily than in the prior art.

Moreover, a fuel trap unit (138) that removes fuel gas from the reformed gas (118) can be disposed between the aforementioned manifold (116) and the above-mentioned CO removal unit (124).

The fuel trap unit (138) installed between the manifold (116) and the CO removal unit (124), can prevent fuel gas that was unreformed in the reforming unit after entering the CO removal unit, and adhering to the CO removal catalyst, resulting in interference with the CO selective oxidation reaction or the CO shift reaction, thus, CO can be removed efficiently, and at the same time heat produced in the reforming unit (114) can also be prevented from being transmitted to the CO removal unit and the reformed gas (118) can be cooled in the fuel trap unit.

It is also preferred that a feed tube (142) is provided that supplies oxygen, air or steam to the reformed gas (118) as it is being sent from the aforementioned manifold (116) to the above-mentioned CO removal unit (124).

As oxygen (air) or steam is supplied to the reformed gas (118) as the mixture is being sent into the CO removal unit, an appropriate amount of oxygen and steam can be provided to satisfy the above-mentioned selective CO oxidation reaction ($CO+0.5O_2 \rightarrow CO_2$) or the CO shift reaction ($CO+H_2O \rightarrow CO_2+H_2$), and at the same time, by cooling the reformed gas, the temperature of the CO removal unit can be prevented from increasing excessively, and so the CO removal reaction can proceed more rapidly.

Here, the aforementioned CO removal unit (124) is composed of one partition or two or more partitions; on the upstream side of each partition, feed tubes (142a, 142b) can be constructed to supply oxygen, air or steam.

For example, the CO removal unit can be divided into two partitions; a steam feed tube is installed in front of the upstream partition filled with a catalyst appropriate for the CO shift reaction, and an oxygen feed tube is provided before the downstream partition charged with a catalyst suitable for the selective CO oxidation reaction, thus CO can be removed efficiently, and a reformed gas (refined gas) with a higher hydrogen purity than in the prior art can be produced.

Other objects and advantages of the present invention are revealed in the following paragraphs referring to the attached drawings.

DESCRIPTION OF PREFERRED EMBODIMENTS

Figure 1:
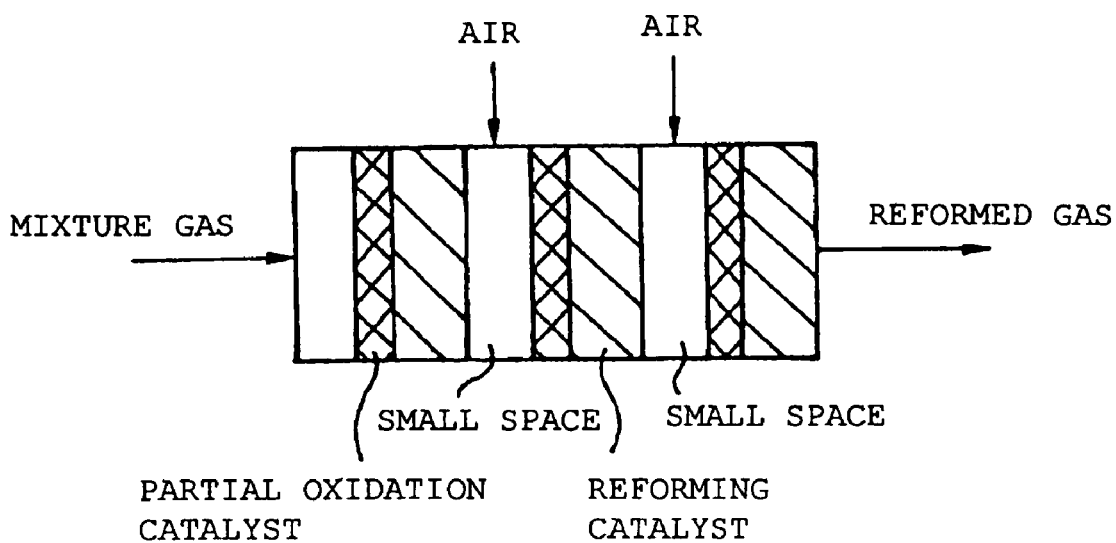
FIG. 1 is a schematic view of a conventional series-type reforming device.
Figure 2:
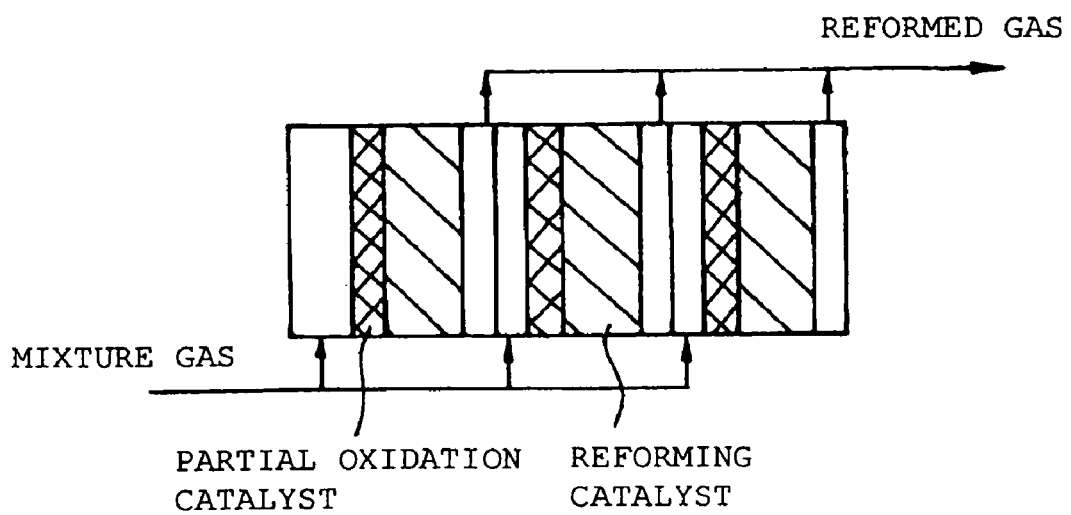
FIG. 2 is a schematic view of a conventional parallel-type reforming device.

The following paragraphs describe preferred embodiments of the present invention referring to the drawings. The same reference numbers are used to describe identical portions, and no duplicate descriptions are given.

The present invention relates to the method and apparatus for converting a gas mixture containing fuel gas, steam and air into a fuel gas containing hydrogen, mainly intended for use on an automobile etc. Principally as a hydrogen feed source for a fuel cell. Since it is expected that methanol can be supplied stably at a low cost in the future, the case of reforming methanol using methanol as the fuel is described emphatically below.

Generally, a methanol reforming device causes methanol ($CH_3OH$) to react with steam ($H_2O$) using a catalyst; as a result of the reactions shown by the following equations (A) and (B), methanol ($CH_3OH$) is reformed and hydrogen ($H_2$) is generated.

$$CH_3OH \rightarrow CO + 2H_2 - 21.7 \text{ Kcal} \quad (A)$$

$$CH_3OH + H_2O \rightarrow CO_2 + 3H_2 - 11.9 \text{ Kcal} \quad (B)$$

$$CH_3OH + 0.5O_2 \rightarrow CO_2 + 2H_2 + 45.3 \text{ Kcal} \quad (C)$$

$$CO + 0.5O_2 \rightarrow CO_2 + 67.6 \text{ Kcal} \quad (D)$$

$$CO + H_2O \rightarrow CO_2 + H_2 + 9.8 \text{ Kcal} \quad (E)$$

Obviously from equations (A) and (B), the methanol reforming reaction is endothermic, therefore, to increase the hydrogen-production rate and increase the reaction rate, heat must be added, and heat dissipation from the reforming portion (reforming unit) must be prevented.

Therefore, in a conventional reforming device, a combustion chamber is installed adjacent to the reforming unit to heat up the unit, or the fuel gas etc. is preheated using a preheater and then fed into the reforming unit, or using the reaction (C), the reforming unit is heated internally (auto-heating) system. In these cases, heat insulation material etc. is used to prevent heat from being lost from the reforming unit to the outside.

Figure 3:
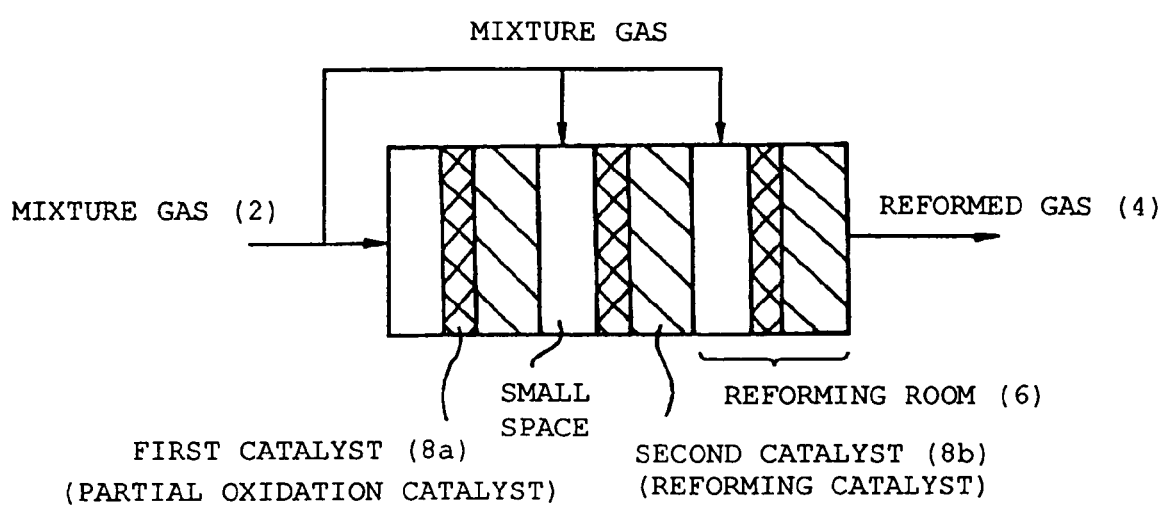
FIG. 3 is a schematic view of the reforming method according to the present invention.
Figure 4:
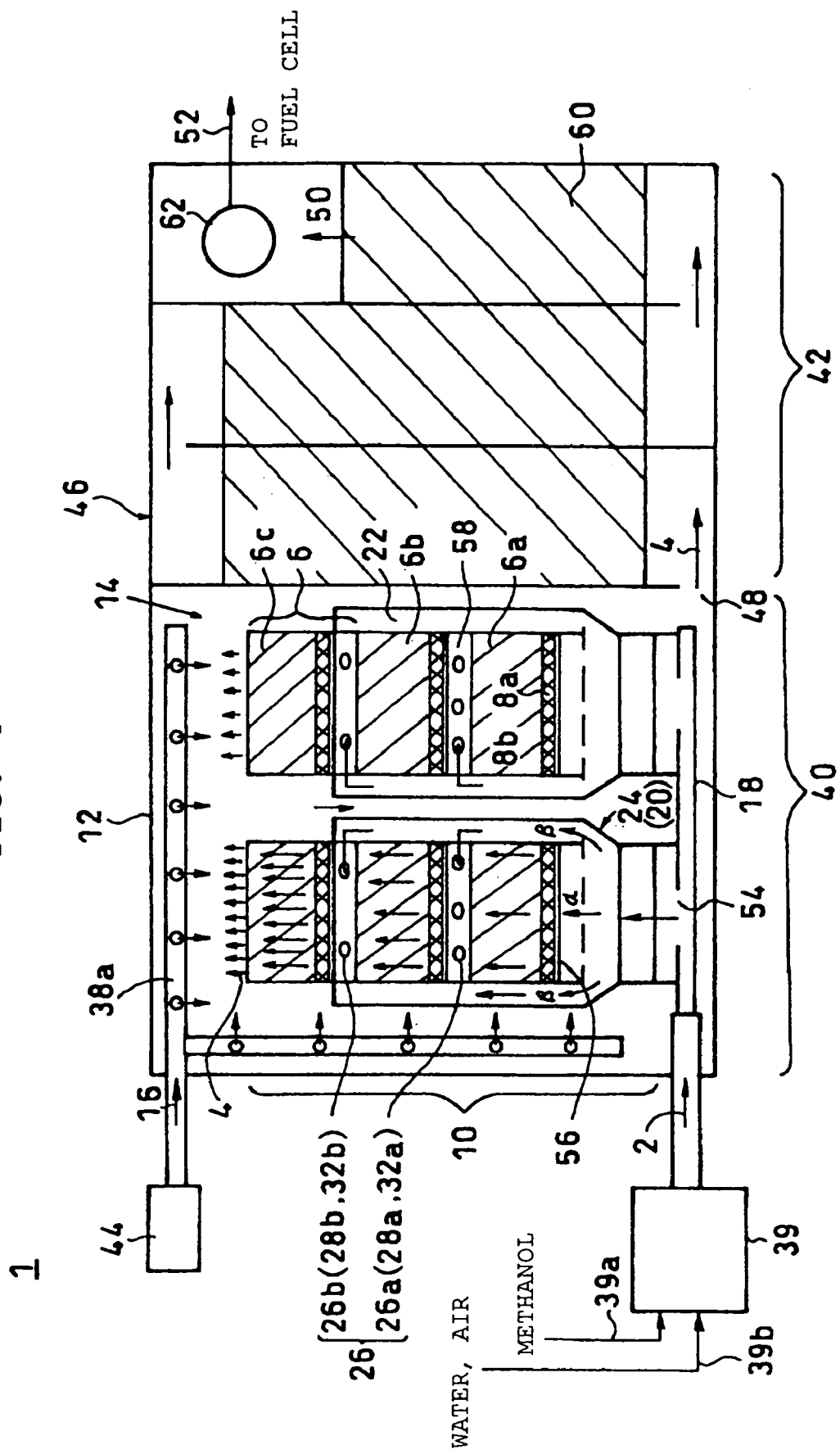
FIG. 4 shows a configuration of the first embodiment of the reforming apparatus according to the present invention.

FIG. 3 shows a general concept of the reforming method according to the present invention, and FIG. 4 is a configuration view showing the first embodiment of the reforming apparatus using the reformer according to the present invention.

The reforming apparatus 1 in this embodiment is composed generally of an evaporator 39, a reformer 40, a CO removal unit 42 and a combustor 44. Here, the reformer 40 and the CO removal unit 42 are installed in a rectangular casing 46, seperately from each other. A communication port 48 is provided in the partition between the reformer 40 and the CO removal unit 42, through which the reformed gas 4 is sent.

A hydrogen gas feed line 52 is connected to the CO removal unit 42 to supply the hydrogen-rich reformed gas (refined gas 50) produced by removing carbon monoxide from the reformed gas 4 created through a reforming reaction in the reformer 40, to a fuel cell (not illustrated) disposed outside the main unit of the reforming apparatus.

The evaporator 39 is provided with a methanol feed tube 39a that supplies methanol reforming fuel from an external device, and a water/air feed tube 39b to supply water and air.

Methanol, water and air are mixed in the evaporator 39, heated up by a heat source using, for instance, combustion heat, to produce a gas mixture 2 with a temperature as high as about 180~230° C. which is fed under pressure to the mixed gas feed tube 18.

The mixed gas feed tube 18 passes into the reformer 40, and branches inside. Along the length and at the end of each branch, are installed screwed gas feed ports 54 and a plurality of reforming tubes 10 each with three reforming rooms connected in series which take in the gas mixture 2 at one end and discharge the reformed gas 4 containing hydrogen from the other end (starting from the bottom, each reforming room is called "lower reforming room 6a", "middle reforming room 6b" and "upper reforming room 6c").

Individual reforming tubes 10 can be freely removed from the gas feed port 54 by unscrewing, so each tube can be replaced independently from the others. The three reforming rooms 6a, 6b and 6c are connected together by screw threads provided on the outer surface of the opening at the bottom end of each reforming room, and screw threads machined on the inner periphery of the opening at the top end. In this way, each unit of a reforming tube or room can be replaced, so the apparatus can be maintained more easily than in the prior art.

Inside each reforming room, a first catalyst that catalyzes the partial oxidation in an oxygen environment (called the "partial oxidation catalyst 8a") is filled in the bottom, that is, upstream in the direction of the flow of the mixed gas 2, while a second catalyst for reforming (called the "reforming catalyst 8b") is charged in the bottom, i.e. downstream in the direction of the gas flow. Therefore, the partial oxidation reaction and the reforming reaction take place in the upstream and downstream portions of each reforming room, respectively. The partial oxidation and reforming catalysts can also be arranged to be honeycomb shaped catalysts.

Generally, different catalysts are used for each of the above catalysts; palladium for the partial oxidation catalyst 8a and copper zinc alloy for the reforming catalyst 8b. However, by using a catalyst that can accelerate both the partial oxidation and the reforming reactions, such as heat-resistant copper-zinc alloys, both catalysts can be made identical to each other. As shown in FIG. 4, an outer cylinder 24 covers the entire lower reforming room 6a, the entire middle reforming room 6b and the lower end of the upper reforming room 6c, that is, one end of the bottom portion of the reforming tube 10 and about two thirds of the lower portion of the side surface. The lower end of the outer cylinder 24 is connected to the gas feed port 54, and the upper end thereof is attached to the side surface of the reforming tube 10. The portion of the reforming tube 10 enclosed by the outer cylinder 24 forms a coaxial double-walled tube in which the peripheral gap 22 provides a passage for the gas mixture 2, leading to the reforming tube 10.

On the side surface of the reforming tube 10 where the lower end of the middle reforming room 6b and the lower end of the upper reforming room 6c are located and enclosed by the outer cylinder 24, there are inlet ports 26a and 26b that supply the gas mixture 2 to the middle reforming room 6b and the upper reforming room 6c, respectively, from the gap 22; these inlet ports 26a, 26b are provided with flow control mechanisms 28a, 28b composed of flow control valves that can adjust the diameters of the inlet ports. The flow control mechanisms 28a, 28b adjust the flows of the gas mixture 2 supplied to the middle and upper reforming rooms 6b and 6c. The gas mixture 2 is supplied to the lower reforming room 6a through an opening at the bottom of the lower reforming room 6a.

In addition, a sintered panel 56 is provided in the opening at the lower end of each reforming room. Here, because the sintered panel 56 is a structure with many fine holes, the gas mixture 2 passes through these fine holes and flows evenly into the reforming room.

Next, features of the reforming apparatus of this embodiment are described by following the flow of the supply of the gas mixture 2.

Part of the gas mixture 2, sent under pressure towards the gas feed port 54 through the mixed gas feed tube 18, is supplied as shown by the arrow α in FIG. 4, from lower end of the reforming tube 10 to the lower reforming room 6a, and the rest is supplied to the middle and upper reforming rooms 6b and 6c through the gap 22 and inlet ports 26a, 26b as shown by the arrow β.

Part of the gas mixture 2 sent to each reforming room contacts the partial oxidation catalyst 8a loaded into the upstream end, generates heat due to the partial oxidation reaction ($CH_3OH+0.5O_2 \rightarrow CO_2+2H_2+45.3$ Kcal), and directly heats the balance of the gas mixture and the adjacent reforming catalyst 8b on the downstream side, to temperatures appropriate for the reforming reaction (auto-heating system). As the rest of the gas mixture 2 is heated up, it stimulates the reforming reaction by contacting the active surface of the reforming catalyst 8b on the downstream side, so producing the reformed gas 4.

The reforming reaction ($CH_3OH \rightarrow CO+2H_2-21.7$ Kcal, $CH_3OH+H_2O \rightarrow CO_2+3H_2-11.9$ Kcal) is an endothermic reaction, therefore, the heat of this endothermic reaction is added by the reaction heat due to the partial oxidation reaction.

The gas mixture 2, having entered the lower reforming room 6a as shown by the arrow α in FIG. 4, is subjected to the partial oxidation and reforming reactions, and then moves to the middle reforming room 6b. At this time, the reacted gas mixture is mixed with the gas mixture 2 (β) supplied through the inlet ports 26a located at the bottom end of the middle reforming room 6b, in the small space 58 formed between the lower reforming room 6a and the middle reforming room 6b.

In the middle reforming room 6b, similar partial oxidation and reforming reactions also take place, and after these reactions, the gas mixture moves to the upper reforming room 6c. Also at this time, the gas mixture 2 is fed in through the inlet port 28b in the same way as above, and mixing of the gases takes place in the small space 58 formed between the middle and upper reforming rooms 6b and 6c.

Identical partial oxidation and reforming reactions occur also in the upper reforming room 6c, as described above, and after that, hydrogen-rich reformed gas 4 is discharged from an opening at the top end of the upper reforming room 6c.

That is, the gas mixture 2 (α) supplied to the bottom end of the lower reforming room 6a is reformed in the three (lower, middle and upper) reforming rooms, while the gas mixture 2 (β) supplied through the inlet ports 26a is reformed in two (middle and upper) reforming rooms, and the gas mixture 2 supplied through the inlet ports 26b is reformed in one (upper) reforming room. Therefore, the total length over which the gas mixture 2 is in contact with the reforming catalyzer 8b is increased, so the reforming rate is improved and is higher than that of a conventional parallel-type reformer.

Since internal heating is provided by the auto-heating system at a number of stages in each reforming room, the temperature of the reforming catalyst 8b can be increased evenly and rather quickly after the reforming apparatus is started up without causing irregularities in the temperature distribution.

In addition, because methanol vapor, steam and air are premixed completely in the evaporator 39 to produce the gas mixture 2 which is supplied to each reforming room, unlike the series-type reformer, the problem of incomplete mixing of the gas mixture and air never occurs. Moreover, no piping etc. is required to introduce air from the outside, instead the gas mixture 2 is distributed internally to each reforming room and therefore, the construction of the reformer 40 can be simplified.

At inlet ports 26a, 26b, flow control mechanisms 28a, 28b composed of flow control valves are provided to adjust the flows of the gas mixture 2 entering the reforming rooms 6b, 6c, and these flow control valves are equipped with constrictions (not illustrated) that are opened and closed by external power. By adjusting these constrictions, the flow of the gas mixture 2 supplied to each reforming room can be adjusted. In place of the flow control mechanisms 28a, 28b, flow regulate means 32a, 32b such as orifices can also be used.

The reforming apparatus 1 of this embodiment of the present invention is also provided with an initial heating gas tube 38a that introduces high-temperature heating gas 16 from outside into the space 14 between the reformer housing 12 and the reforming tube 10 and directs the gas towards the reforming tube 10.

In a conventional reformer, the reforming tube is warmed up directly by the heat produced from the partial oxidation catalyst 8a and the reforming catalyst 8b. Consequently, a fairly long time is required before the reforming catalyst is heated sufficiently and the reformer is ready for operation, therefore, the reformer cannot satisfy the need for starting the device quickly and supplying hydrogen gas soon.

In the reforming apparatus 1 of this embodiment of the present invention, the reforming tube 10, the reforming catalyst 8b, etc. can be heated up from outside while the dissipation of heat from the reforming catalyzer etc. to the outside can be prevented, as gases such as air are heated by the combustor 44 to produce the high-temperature heating gas 16 which is introduced into the reformer 40 through the first heating gas tube 38a and injected into the space 14 between the reformer housing 12 and the reforming tube 10.

More explicitly, because the reforming tube 10 and the reforming catalyst 8b are previously warmed up (preheated), reformed gas 4 with a high reforming rate can be produced soon after the reformer 40 is started up. The gas mixture 2 is supplied to each reforming room after warming up is finished and the introduction and ejection of the heating gas 16 is stopped. Instead of using the heating gas 16, it is also possible to preheat the reforming tube 10, the reforming catalyst 8b, etc. by installing a heating wire etc. around or inside the reforming tube 10.

The gas mixture with a large concentration of hydrogen produced by the reforming reaction in the reforming tube 10 is discharged from the top of the reforming tube 10, completely fills the space 14 inside the reformer housing 12, and then passes through the communication port 48 to the CO removal unit 42 installed adjacent to the reformer 40.

In the CO removal unit 42, excess carbon monoxide (CO) contained in the reformed gas mixture (reformed gas 4) is removed. This is because if carbon monoxide is supplied to the fuel electrode of a fuel cell, it is adsorbed on the active parts of the catalyst on the fuel electrode in competition with hydrogen, thereby the electrode catalyst in the fuel cell is poisoned, interfering with the reaction on the electrode and degrading the power generating performance, so it has to be prevented.

The CO removal unit 42 is filled with a CO removal catalyst 60, which promotes the CO shift reaction ($CO+H_2O \rightarrow CO_2+H_2$) and the selective CO oxidation reaction ($CO+0.5O_2 \rightarrow CO_2$) in the reformed gas 4 sent from the reformer 40, and the carbon monoxide poison is removed.

The reformed gas 4, after the carbon monoxide has been satisfactorily removed in the CO removal unit 42, is now a refined gas which flows out of the refined gas outlet port 62 provided at the furthest downstream portion of the CO removal unit 42, and is supplied to the hydrogen electrode (anode: not illustrated) of the fuel cell through a hydrogen gas feed line 52, where it is used to generate electric power.

Figure 5:
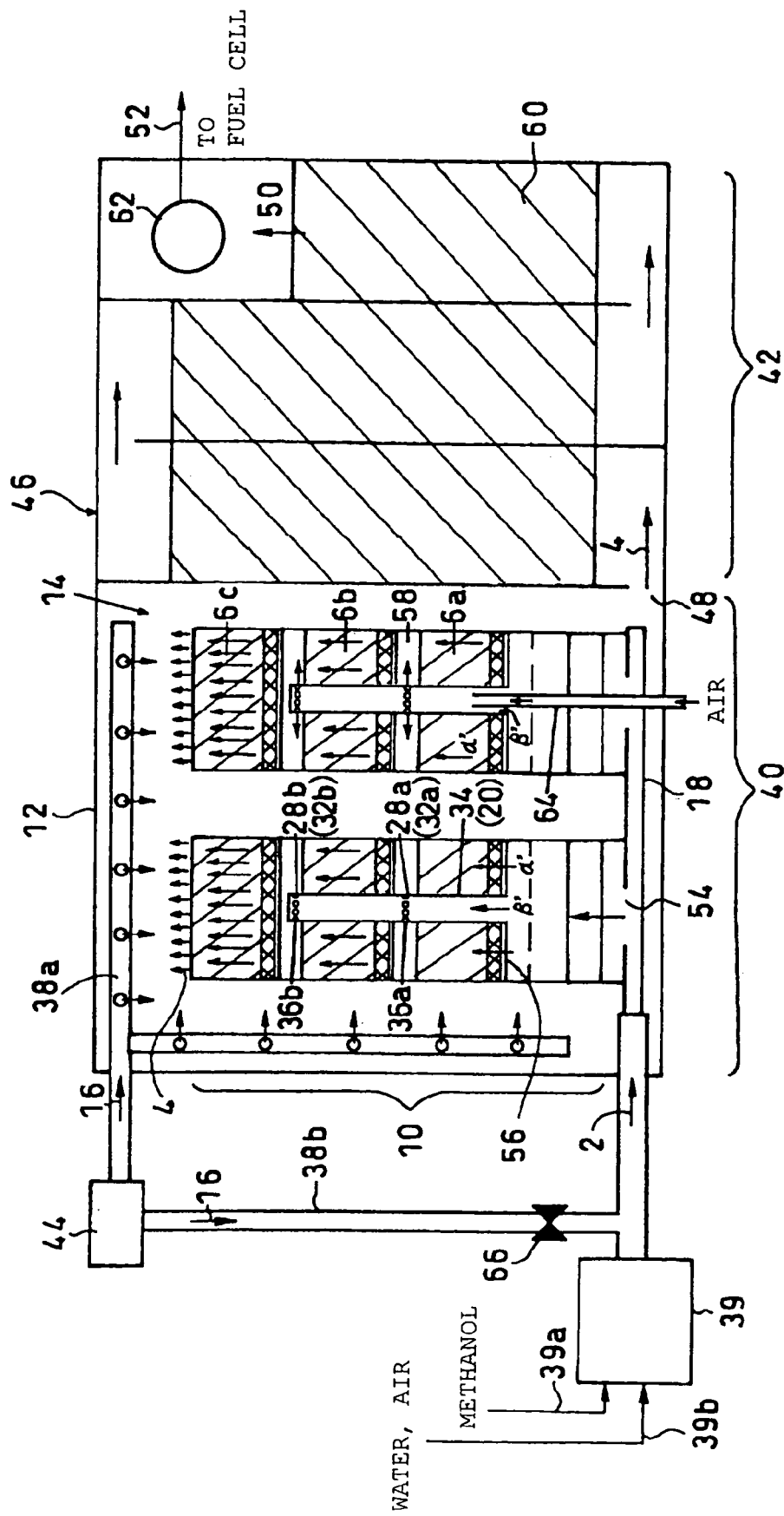
FIG. 5 shows a configuration of the second embodiment of the reforming apparatus according to the present invention.

FIG. 5 shows a second embodiment of the reforming apparatus according to the present invention. The component parts of the reforming apparatus 3 of this embodiment, other than the penetration tube (gas feed means) and the second heating gas tube to be described in detail later are identical to those of the reforming apparatus 1 of the first embodiment, therefore, these portions are not described below.

The mixed gas feed tube 18 is joined with a screwed connection to the reforming tube 10 comprised of a three-stage reforming room with lower, middle and upper stages (6a, 6b, 6c), as in the first embodiment. The mixed gas feed tube 18 is connected to a penetration tube 34 composed of a hollow tube that penetrates the interior of the lower reforming room 6a and the middle reforming room 6b from the end of the reforming tube 10 on the upstream side, and the penetration tube 34 allows the gas mixture 2 to flow into the interior thereof.

Inlet ports 36a, 36b are provided in the surface of the penetration tube 34 near the bottom ends of the middle and upper reforming rooms 6b, 6c to supply the gas mixture 2 to the rooms 6b and 6c, respectively. These inlet ports are equipped with flow control mechanisms 28a, 28b composed of flow control valves that adjust the flows of the gas mixture 2 supplied to each reforming room. It is of course possible, as in the first embodiment of the reforming apparatus according to the present invention, that flow regulate means 32a, 32b such as orifices are used in place of the flow control mechanisms 28a, 28b.

Part of the gas mixture 2, supplied through the mixed gas feed tube 18, passes from the bottom of the reforming tube 10, to the lower reforming room 6a as shown by the arrow α' in FIG. 5, and the rest of the gas mixture (β') flows into the penetration tube 34. The gas mixture 2 supplied to the lower reforming room 6a undergoes partial oxidation and reforming reactions as described before, and then flows into the middle reforming room 6b. At this time, the gas mixture (α') mixes with the gas mixture 2 (β') entering through the inlet port 36a, in the small space 58 formed between the lower and middle reforming rooms 6a, 6b. Partial oxidation and reforming reactions also take place in the middle reforming room 6b in the same way, and after reacting the gas mixture flows into the upper reforming room 6c. In this case too, the gas mixture 2 (β') is supplied through the inlet port 36b, and mixes in the small space formed between the middle and upper reforming rooms 6b and 6c. The gas mixture 2, after also being partially oxidized and reformed in the upper reforming room 6c as described above, is discharged from the opening at the top of the upper reforming room 6c as a reformed gas 4 rich in hydrogen.

In other words, in the reforming apparatus 3 of this embodiment, the reforming catalyst 8b can also be heated up evenly without any irregularity in the temperature distribution, in each reforming room, and the length of the passage in which the gas mixture 2 is in contact with the reforming catalyst 8b can be made longer than in the prior art, therefore, the reforming rate can be increased. In addition, the gas mixture 2 can be premixed before being fed to each reforming room. Furthermore, because nothing is attached to the outer periphery of the reforming tube 10, cylindrical reforming tubes 10, if used, can be arranged conveniently inside the reformer housing 12.

As shown in the reforming tube illustrated on the right side of FIG. 5 (the equipment is omitted from illustration on the left side), whenever required, an air inlet tube 64 can be incorporated for introducing outside air into the inside of the penetration tube 34, and after the gas mixture (β') is completely mixed with air introduced through the air inlet tube 64 inside the penetration tube 34, the gas mixture can be supplied to the middle and upper reforming rooms 6b, 6c. By mixing air with the gas mixture 2 (β'), the oxygen concentration thereof can be adjusted, and the partial oxidation reactions in the middle and upper reforming rooms 6b, 6c can be accelerated or controlled.

In the reforming apparatus 3 of this embodiment, in addition to the first heating gas tube 38a used in the first embodiment, a second heating gas tube 38b is connected to the mixed gas feed tube 18 so that high-temperature gas 16 can be introduced from the combustor 44. Part number 66 represents a gate valve.

High-temperature gas 16 is introduced through the first high-temperature gas tube 38a into the space 14 inside the reformer housing 12, and the reforming tube 10 and the reforming catalyst 8b are heated from outside, and also the high-temperature gas 16 is introduced into the reforming tube 10 through the mixed gas feed tube 18, thus heating the reforming tube 10 and the reforming catalyst 8b internally. After the reforming catalyst 8b is completely preheated, the flow of high-temperature gas 16 is stopped, the gas mixture 2 is fed to each reforming room, thereby reformed gas 4 with a high degree of reforming can be obtained immediately after supplying the gas mixture 2. In addition, such a preheating process is also preferable because it prevents fuel or water from being condensed in the reforming catalyst 8b.

Figure 6:
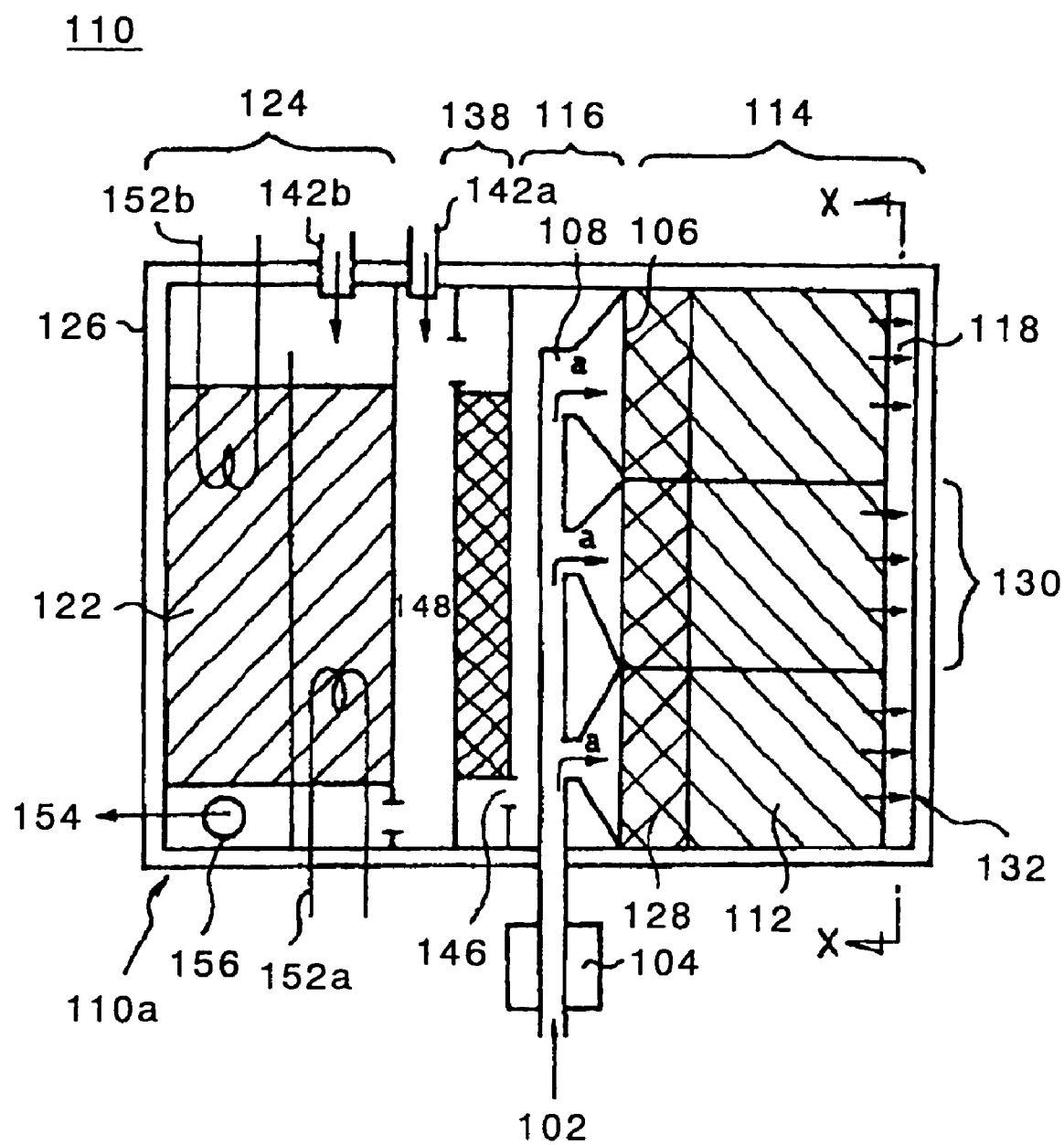
FIG. 6 shows a configuration of the third embodiment of the reforming apparatus according to the present invention.
Figure 7:
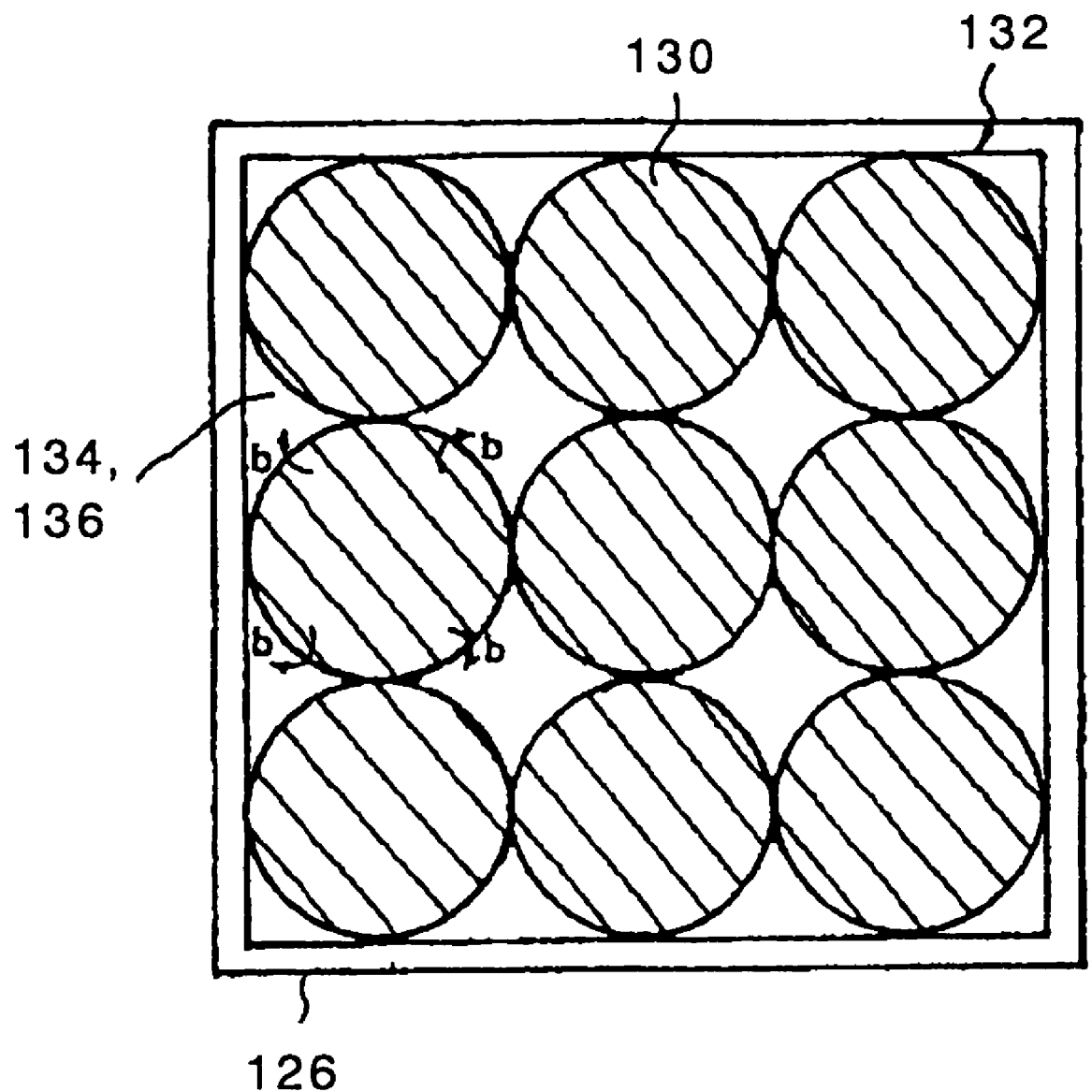
FIG. 7 is a sectional view along the line X-X in FIG. 6.

FIG. 6 shows a general view of the third embodiment of the reforming apparatus according to the present invention, and FIG. 7 is a cross sectional view along the line X-X in FIG. 6.

In FIG. 6, the reforming apparatus 110 according to the present invention is separated generally into a heating unit 104, a reforming unit 114, a manifold 116, a CO removal unit 124 and a casing 126. The main unit of the reforming apparatus 110a is configured with the reforming unit 114, manifold 116 and CO removal unit 124 as an integrated unit housed in a rectangular casing 126.

A fuel tube (not illustrated) is connected to the heating unit 104 to supply fuel for combustion, and the fuel is burned and the combustion heat thereof is utilized as a heat source to evaporate and heat up the gas mixture in the same way as known in the prior art, therefore, a detailed description of the heating unit 104 is omitted.

In the heating unit 104 methanol, water and air are mixed, evaporated and heated to about 200° C. to produce the gas mixture 102 which is sent to the distribution tube 108 in the main unit of the reforming apparatus 110a. The distribution tube 108 branches in the manifold 116 of the main unit of the reforming apparatus 110a; each branch passage is provided with an orifice (not illustrated), so that an equal amount of the gas mixture 102 is distributed to each branch. The end of each branch of the distribution tube 108 is equipped with a branch port 106 which communicates with the reforming room 132.

The reforming room 132 is composed of nine cylindrical reforming tubes 130 arranged parallel to each other in three rows of three tubes each. One end of each reforming tube 130 is connected to a branch port 106 of the distribution tube 108, and the other end thereof opens into the casing 126. The individual reforming tubes 130 can be removed and replaced.

In addition, a partial oxidation catalyst 128 is loaded into the interior of each reforming tube at the upstream end for the aforementioned (C) reaction and a reforming catalyst 112 is loaded into middle and downstream portions thereof for the reforming reaction.

A passage 136 for the reformed gas is provided by the gaps in the axial direction of the reforming tubes between the adjacent reforming tubes 130 and between the reforming tubes and the casing 126, and this passage for the reformed gas communicates with the manifold 116.

The high-temperature gas mixture 102 sent from the heating unit 104 through the distribution tube 108 is distributed evenly as shown by the arrows a, and flows through each branch port 106 provided at the end of each branch tube 108. Each branch port 106 is joined to a reforming tube 130 with a leak tight joint, and the gas mixture 102 enters each reforming tube 130 from its branch port 106, and flows through the reforming tube 130. The gas mixture 102 is heated up to a temperature appropriate for the reforming reaction after being partially oxidized in the upstream portion of the reforming tube 130, and also heats the reforming catalyst 112, which catalyzes the reforming reaction as the gas contacts the reforming catalyst in the middle and downstream portions, thus a hydrogen-rich reformed gas is produced (auto-heating system).

Here, as the high-temperature gas mixture 102 is evenly distributed and sent into each reforming tube 130 and uniformly distributed across the cross section of the tube, irregularities in the flow of the gas mixture in the reforming catalyst are prevented and the reforming reaction can take place more efficiently than in the case where the gas mixture is passed through the same amount of the reforming catalyst contained in a single catalyst vessel.

The reformed gas 118, having passed through the reforming tubes 130 and been subjected to a reforming reaction, is discharged from the ends of the reforming tubes, and changes its direction of flow through 180° as shown by the arrows b in FIG. 7, flows into the reformed gas passages 136, and enters the manifold 116 which communicates with the reformed gas passages 136.

The gas mixture that flows through the reforming catalyst undergoes an endothermic reforming reaction, and the temperature thereof decreases to a predetermined level, before it is discharged from the end of the reforming tube as a reformed gas; however, the temperature thereof is still high, so the reformed gas 118 is made to flow through the reforming gas passages 136 where it contacts the outer periphery of the reforming tubes 130, so preventing heat from the reforming catalyst 112 from being transmitted to the outside.

The manifold 116 collects the reformed gases flowing through each reformed gas passage, and as shown in FIG. 6, extends across the whole of the casing 126 in the direction perpendicular to the surface of the paper and separates the reforming room 132 from the CO removal unit 124 to be described later, therefore, the manifold also prevents heat from the reforming unit from being lost to the CO removal unit 124.

A fuel trap unit 138 is located between the manifold 116 and the CO removal unit 124, to remove any fuel gas that was not reformed in the reforming unit 114, therefore, fuel gas in the reformed gas 118, which was unreacted and collected in the manifold 116, is captured in this fuel trap unit. This fuel trap unit which is adjacent to the manifold 116 is provided with a communication port that communicates with the manifold at the bottom end thereof, and extends across the whole casing in the direction perpendicular to the surface of the paper, as shown in FIG. 6, in the same way as the manifold. The unreacted fuel gas is removed from the reformed gas when the reformed gas flows through the fuel trap unit 138 from bottom to top. The removed fuel gas is discharged to the outside through an exhaust pipe (not illustrated), and is discarded or reused as a fuel etc. to be burned in the heating unit. In the above, the fuel trap unit 138 also plays a role in separating the reforming room 132 from the CO removal unit 124.

The reformed gas 118 after leaving the fuel trap unit 138 flows from the top of the fuel trap unit into a narrow space 148 formed adjacent to the fuel trap unit 138. A feed tube 142a for supplying air or oxygen from outside is provided in the narrow space 148, wherein the reformed gas 118 discharged from the fuel trap unit 138 is mixed with air or oxygen supplied from the feed tube 142a. In this way, the temperature of the reformed gas 118 is decreased together with providing a supply of oxygen necessary for the selective CO oxidation reaction to be described later.

The narrow space 148 communicates at the bottom thereof with the CO removal unit 124, whereby the reformed gas 118 mixed with air etc. enters the CO removal unit. The CO removal unit 124 is divided into two parts composed of the front and rear portions shown in FIG. 6; an air or oxygen feed tube 142b is introduced from outside, between the front and rear portions. Because the CO removal unit is divided, air or oxygen can be supplied at the inlet of each section, the CO removal reactions take place in multiple stages, the temperature rise produced by the CO removal reaction can be reduced near the upstream end of the CO removal catalyst which acts dominantly, and an excessive temperature increase in parts of the CO removal catalyst is prevented, so that CO can be removed efficiently during the exothermic reaction.

An optimum catalyst for a selective CO oxidation reaction (for example, Ru) is loaded into the front and rear portions.

In addition, cooling tubes 152a, 152b are provided in the upstream parts of the front and rear portions, to cool the catalyst by circulating, for instance, cold water or air, using an external device. This is because the selective CO oxidation reaction generates a large amount of heat ($CO+0.5O_2 \rightarrow CO_2+$ 67.6 Kcal), and by cooling the upstream portion of the CO removal catalyst where the reaction mainly takes place, the reaction can be driven towards the right.

In the CO removal unit 124, the selective CO oxidation reaction takes place, and the carbon monoxide is removed completely from the reformed gas 118 to produce the refined gas 154 which flows out of the refined gas outlet port 156 provided at the bottom of the rear stage, and is supplied to the hydrogen electrode (anode: not illustrated) of a fuel cell.

According to the aforementioned reforming method and reformer of the present invention, the gas mixture is supplied to reforming rooms connected together in a number of stages, and each reforming room is heated by the auto-heating system, thereby the catalyst is heated up evenly so that it can reform the gas soon after the reformer is started and the length of the passage in which the gas mixture undergoes the reforming reaction can be made long, so that the reformed gas with a high degree of reforming can be produced soon after operations begin.

In addition, by using detachable and replaceable reforming tubes and rooms and by simplifying the means of supplying the gas mixture to each reforming room, an easy to maintain, compact reformer is offered.

More preferably, by introducing high-temperature heating gas into the interior of the reformer, the reforming tubes, catalysts, etc. can be heated from outside and/or internally, and by warming up (preheating) the reformer in advance, the reforming reaction can take place efficiently and quickly soon after the operation begins so that reformed gas (refined gas) with a high degree of reforming can be fed to the fuel cell where electric power is generated.

The above-mentioned reforming apparatus according to the present invention can perform a complete reforming reaction by passing the gas mixture evenly into a reforming tube with an appropriate cross section, or into a plurality of such reforming tubes, thereby eliminating irregularities in the flow of gas in the reforming catalyst, and causing the gas mixture to contact the reforming catalyst efficiently. In addition, by making the high-temperature reformed gas flow around the reforming tubes, heat losses from the reforming catalyst to the outside are reduced, and by preventing heat losses, the endothermic reforming reaction can be increased.

More preferably, a manifold etc. is inserted between the reforming unit and the CO removal unit, so as to prevent heat from being transmitted from the reforming unit to the CO removal unit, thus the exothermic CO removal reaction can be increased, so the concentration of carbon monoxide contained in the refined gas can be reduced sufficiently, and in addition, the reforming apparatus can be reduced in size.

However, the present invention is not limited only to the above-mentioned embodiments, but also covers various modifications as long as the scope of the claims of the invention is not exceeded.

What is claimed is:

1. A reforming apparatus comprising
a mixed gas feed tube that supplies a gas mixture composed of a fuel, water and air, and
a reforming tube that converts the gas mixture into a reformed gas containing hydrogen, wherein
the reforming tube comprises two or more reforming rooms connected together in series, in which the gas mixture is supplied to one end and the reformed gas is discharged from the other end thereof,
each of the reforming rooms is filled with a first catalyst that catalyzes a partial oxidation reaction in an oxygen environment in the upstream portion thereof, and with a second catalyzer for reforming in the downstream portion, and
gas feed means are provided on the mixed gas feed tube, that directly supply the gas mixture to each reforming room, and
wherein a second heating gas tube is connected to the mixed gas feed tube, to introduce a high-temperature heating gas from the outside.

2. A reforming apparatus according to claim 1,
wherein the gas feed means comprises an outer cylinder that covers one end of the reforming tube and at least a part of the side surface thereof, and forms a gap around the reforming tube in the peripheral direction that works as a passage for the gas mixture,
inlet ports are disposed on the side surface of the reforming tube and supply the gas mixture to each reforming room from the gap, and
the inlet ports comprise flow control mechanisms or flow regulate means for adjusting the flow of the gas mixture supplied to each reforming room.

3. The reforming apparatus specified in claim 1, wherein the gas feed means comprises a hollow penetration tube for passing the gas mixture through the interior of at least one of the reforming rooms, from one end thereof in the downstream direction of the reforming tube,
the penetration tube comprises inlet ports to supply the gas mixture individually to each reforming room, and
the inlet ports comprise flow control mechanisms or flow regulate means for adjusting the flow of the gas mixture introduced into each reforming room.

4. The reforming apparatus specified in claim 1, comprising a reformer housing that encases the reforming tube, and a first heating gas tube for introducing a high-temperature heating gas into the space formed between the reformer housing and the reforming tube, from the outside.

* * * * *